US010460194B2

(12) United States Patent
Wolf et al.

(10) Patent No.: US 10,460,194 B2
(45) Date of Patent: Oct. 29, 2019

(54) SYSTEM AND METHOD FOR THE DETECTION AND COUNTING OF REPETITIONS OF REPETITIVE ACTIVITY VIA A TRAINED NETWORK

(71) Applicants: Lior Wolf, Herzlia (IL); Ofir Levy, Jerusalem (IL)

(72) Inventors: Lior Wolf, Herzlia (IL); Ofir Levy, Jerusalem (IL)

( * ) Notice: Subject to any disclaimer, the term of this patent is extended or adjusted under 35 U.S.C. 154(b) by 250 days.

(21) Appl. No.: 15/124,047

(22) PCT Filed: Mar. 6, 2015

(86) PCT No.: PCT/IB2015/000728
§ 371 (c)(1),
(2) Date: Sep. 7, 2016

(87) PCT Pub. No.: WO2015/132665
PCT Pub. Date: Sep. 11, 2015

(65) Prior Publication Data
US 2017/0017857 A1 Jan. 19, 2017

Related U.S. Application Data

(60) Provisional application No. 61/949,926, filed on Mar. 7, 2014.

(51) Int. Cl.
*G06K 9/46* (2006.01)
*G06K 9/00* (2006.01)
(Continued)

(52) U.S. Cl.
CPC ....... *G06K 9/4628* (2013.01); *G06K 9/00335* (2013.01); *G06K 9/00718* (2013.01);
(Continued)

(58) Field of Classification Search
CPC combination set(s) only.
See application file for complete search history.

(56) References Cited

U.S. PATENT DOCUMENTS 6,795,567 B1 *  9/2004  Cham ............... G06T 7/246
                                              382/103
7,035,435 B2 *  4/2006  Li ................... G06F 16/786
                                              382/107

(Continued)

FOREIGN PATENT DOCUMENTS

| CN | 102281385 A | 12/2011 |
| CN | 102281385 B | 3/2013 |
| WO | WO 2015132665 A3 | 12/2015 |

OTHER PUBLICATIONS

PCT/IB2015/000728 Int'l Preliminary Report on Patentability dated Sep. 22, 2016, 6 pages.

(Continued)

*Primary Examiner* — Tsung Yin Tsai
(74) *Attorney, Agent, or Firm* — Devlin Law Firm LLC; James M. Lennon

(57) ABSTRACT

A technique and system for counting the number of repetitions of approximately the same action in an input video sequence using 3D convolutional neural networks is disclosed. The proposed system runs online and not on the complete video. It analyzes sequentially blocks of 20 non-consecutive frames. The cycle length within each block is evaluated using a deep network architecture and the information is then integrated over time. A unique property of the disclosed method is that it is shown to successfully train on entirely synthetic data, created by synthesizing moving random patches. It therefore effectively exploits the high generalization capability of deep neural networks. Coupled with a region of interest detection mechanism and a suitable mechanism to identify the time scale of the video, the system (Continued)

is robust enough to handle real world videos collected from YouTube and elsewhere, as well as non-video signals such as sensor data revealing repetitious physical movement.

18 Claims, 9 Drawing Sheets

(51) Int. Cl.
  *G06K 9/66* (2006.01)
  *G06T 7/246* (2017.01)
(52) U.S. Cl.
  CPC ............... *G06K 9/66* (2013.01); *G06T 7/246* (2017.01); *G06K 2009/00738* (2013.01); *G06T 2207/30242* (2013.01)

(56) References Cited

U.S. PATENT DOCUMENTS

| | | | | |
|---|---|---|---|---|
| 7,526,101 B2* | 4/2009 | Avidan | ............... | G06K 9/32 382/103 |
| 7,675,655 B2* | 3/2010 | Marshall | ............... | G06T 3/4038 340/435 |
| 8,619,187 B2* | 12/2013 | Garg | ............... | H04N 7/0115 348/441 |
| 9,183,466 B2* | 11/2015 | Siskind | ............... | G06K 9/00751 |
| 2003/0018475 A1* | 1/2003 | Basu | ............... | G06K 9/00228 704/270 |
| 2004/0258307 A1* | 12/2004 | Viola | ............... | G06K 9/00369 382/190 |
| 2006/0018516 A1* | 1/2006 | Masoud | ............... | G06K 9/00342 382/115 |
| 2006/0112028 A1* | 5/2006 | Xiao | ............... | G06N 3/08 706/15 |
| 2009/0175496 A1* | 7/2009 | Kondo | ............... | G06K 9/32 382/103 |
| 2012/0008819 A1* | 1/2012 | Ding | ............... | G06K 9/00335 382/100 |
| 2012/0008836 A1* | 1/2012 | Bobbitt | ............... | G06K 9/00771 382/113 |
| 2012/0128212 A1* | 5/2012 | Almbladh | ............... | G06T 7/20 382/107 |
| 2013/0016239 A1* | 1/2013 | Cho | ............... | H04N 5/23277 348/208.4 |

OTHER PUBLICATIONS 6 pages regarding PCT/IB2015/000728: Notification and International Preliminary Report on Patentability (dated Sep. 22, 2016) and Written Opinion of the International Searching Authority (dated Sep. 21, 2015).

9 pages regarding PCT/IB2015/000728: Notification of Transmittal of International Search Report and Written Opinion of the International Searching Authority (dated Sep. 21, 2015), and International Search Report, and Written Opinion of the International Searching Athority (dated Sep. 21, 2015), and ISA—Search Strategy (dated Sep. 17, 2015).

* cited by examiner

SYSTEM AND METHOD FOR THE DETECTION AND COUNTING OF REPETITIONS OF REPETITIVE ACTIVITY VIA A TRAINED NETWORK

CROSS REFERENCE TO RELATED APPLICATION

This application claims priority to U.S. provisional application for patent Ser. No. 61/949,926 filed Mar. 7, 2014, the entire contents of which are incorporated herein by reference.

FIELD OF THE INVENTION

The present invention, in some embodiments thereof, relates to an automated method and system for repetition counting and, more particularly, but not exclusively, to an automated method and system for counting repetitive actions observable in video content.

BACKGROUND OF THE TECHNOLOGY

Several attempts have been made to design a system to automate the process of analyzing a signal input concerning an activity. There is also a desire to utilize input (e.g., from visual or bio-sensor sources) for a detection systems to facility the monitoring of repetitious movement in live or recorded content, such as in pre-captured or real-time video. This content may capture a scene in which the same action is repeated multiple times in consecutive cycles of a relatively uniform length and there is a desire to count the number of repetitions. For example, there may be a desire to count the number of times a bird flapping its wings, a hand strums a guitar, or the number of repetitions performed of the same physical exercise. There is no limit to the number of repetitious actions for which automated counting of a capture visual input might be desired.

Prior techniques for utilizing visual count of repetitious activity with a system for automating the analysis of the content include, U.S. Pat. No. 8,165,349 to Bobbitt et al., which discloses "[t] echniques for analyzing one or more sequential events performed by a human actor to evaluate efficiency of the human actor." This patent does not disclose any technique for actually counting of the observable repetitions performed by the actor, let alone an accurate automated counting system. U.S. Publication No. 20140369561 to Gupta et al. discloses "a method and a system for enhancing accuracy of human counting in at least one frame of a captured image in a real-time in a predefined area." This publication discloses a method for detecting and counting of the number of humans in image content, not the counting of repetitions of an action performed by a human, or any other actor for that matter.

U.S. Publication No. 20140270375 to Canavan et. al. discloses "[a] motion tracking system [that] monitors the motions performed by a user based on motion data received from one or more sensors." The only counting method disclosed in this publication involves a "template matching algorithm to identify repetitive features . . . [which] compares the repetitive features to a set of movement templates 27 stored in a movement template database." This counting mechanism taught by this publication, therefore, requires predetermination and analysis of specific movements that will be capable of being monitored by the system. The movement example given is a repeated curl exercise. There are several drawback to the system disclosed by Canavan et al. as it relates to an attempt to automatically count the number of repetitions performed by an actor, not the least of which is the requirement that the action to be counted must have been pre-analyzed and algorithmically tabulated before any counting may be accomplished.

Moreover, most video analytics systems require or assume that the visual content to be analyzed is segmented in time. These analytics tools do not enable the automatic detection of the start and end points of the sequence of repetitive actions to be machine counted, for example, in live video streaming. Nor do these systems enable for the counting to start during the period when the repetitive action is still initially being detected. None of these systems are directed for use with real world videos, such as non-commercial video content collected by YouTube or other sources, where only a handful of repetitions might be identified, the cycle length changes significantly throughout the video, and each repetition is often visually different from the other repetitions.

Prior systems are primarily based on frequency domain analysis or on autocorrelation which are unable to work on live visual inputs without post-processing.

What is needed is a better scheme that enables machine counting of repetitious behavior from a wide variety of visual sources without advanced processing or preparation of the source, nor the requirement for post-capture processing of visual content to enable automated counting.

SUMMARY OF THE INVENTION

The present invention, in some embodiments thereof, relates to an automated method and system for repetition counting and, more particularly, but not exclusively, to a method and system for counting repetitive signals or actions in time within visual content by reading an input of visual content containing a plurality of fixed length windows in time, applying a classifier to estimate the cycle length in each time window, and integrating the counts using at least two registers. The method and system may further employ selection between multiple time scales, and automatic start and stop counting based on the entropy of the classifier.

Given an visual content input capturing a scene or signal in which the same action is repeated multiple times in consecutive cycles of a relatively uniform length, the present invention seeks to count the number of repetitions. The visual content might depict, for example, a bird flapping its wings, a hand playing a guitar, multiple repetitions of the same exercise etc. There are no restrictions on the nature of the performed action. Nor is source disruption, for example, camera motion, an impediment to the counting to be accomplished by this invention.

In at least one embodiment of the present invention, the system does not assume that the video is segmented in time. It automatically detects the start and end points of the sequence of repetitive actions, and counts the repetitions on a live video stream: the repetitive nature is identified early on and counts commence and update automatically. Even when working with online or real-time visual content, counts are not lost during the time that the system detects the repetitive nature of the action to be counted.

The system of the invention is capable of working with real world videos, for example those collected from YouTube and other sources, and is not restricted to tightly controlled video content captured in a lab. Real world, non-commercial videos present significant challenges that are overcome by the present invention. For example, in many videos there are only a handful of repetitions, the cycle length changes significantly throughout the video and each repetition is often visually different from the other repetitions.

The present invention is a novel online scheme that employs, in at least one embodiment, a shifting window in time. Every window is examined and the number of repetitions is estimated. This is posed as a multiclass classification problem. The information is then integrated smoothly across multiple shifting windows to produce the ongoing counts.

The underlying classification mechanism employed, in at least one embodiment of the present invention, is a convolutional Deep Neural Network (DNN). Since the problem is well defined regardless of the content of the signal (e.g., video, serial images, etc.), the present invention allows for training the network on completely unrealistic synthetic content (e.g., synthetic video). This offers the novel ability to build a real-world system based entirely on unrealistic synthetic data (previous successful usage of synthetic data relied on realistic computer graphics data). The generalization capability of DNNs through the present invention is high enough to enable a new venue of defining computer vision tasks by creating synthetic data that does not resemble any real world signal. Moreover, the probability estimation is valid enough to allow for the entropy of the network's output to be used as a score for detecting the start and end of the action and the appropriate time scale.

The DNN is the only learned part in the system of the present invention. No real images or videos are necessary for training. The system of the present invention requires only a few time scale parameters and thresholds to be set one globally based on observing a few videos. By not training on real world data, the system of the present invention is more robust and works on a variety of datasets without any modifications. In at least one embodiment, the entire system is capable of running at frame rates higher than 50 frames per second on live video using a simple PC.

DETAILED DESCRIPTION

Figure 1:
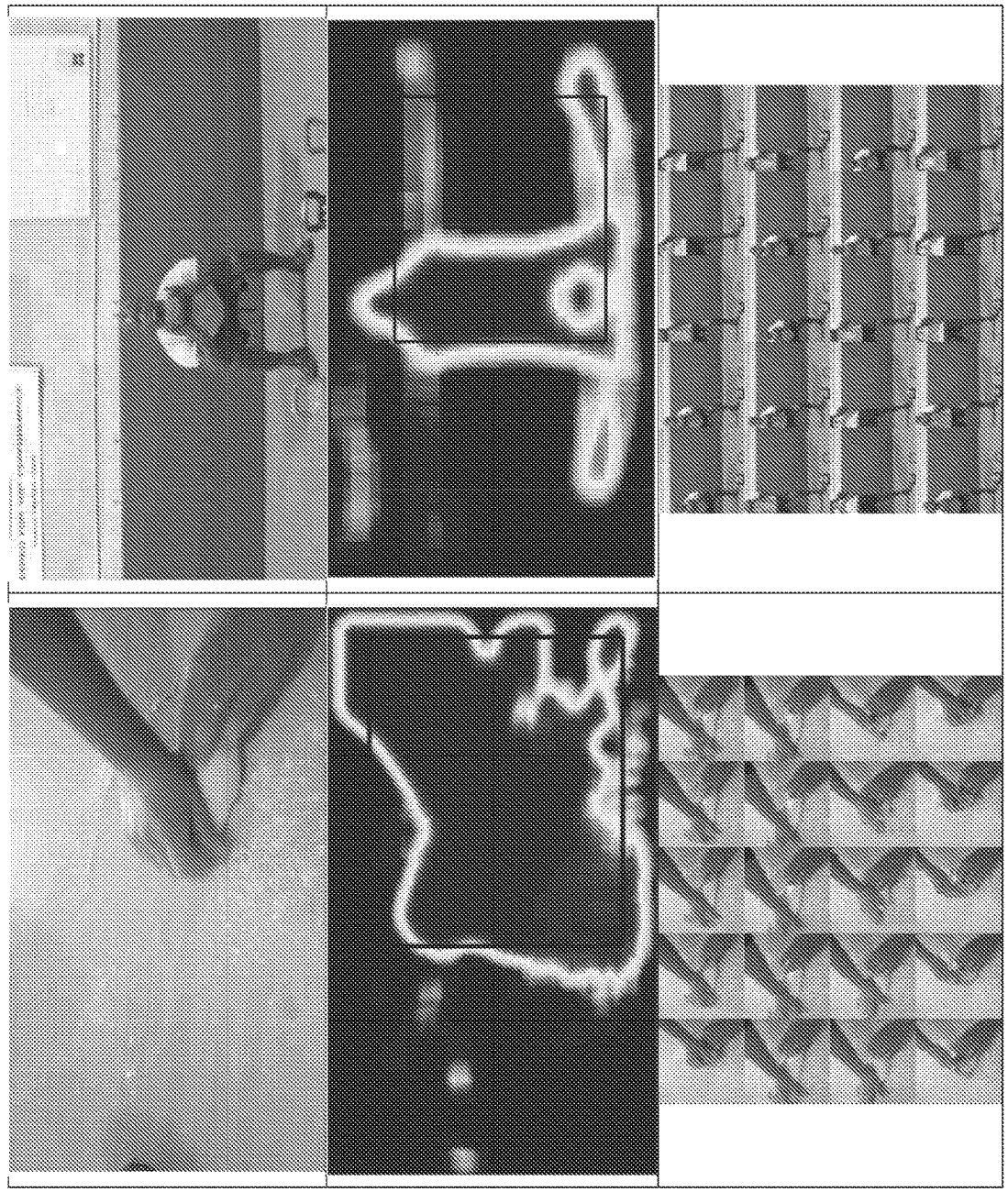
FIG. 1 is a set of example sequences of an action to be detect using the system and method of the present invention showing, at top (first row), in a single frame from the video, followed by (second row) a heat map (before thresholding) of the matrix $E_2$ used in order to detect the Region of Interest [ROI] and the estimated ROI, followed at bottom (third row) by 20 non sequential frames as passed to the DNN classifier.

The task of repetition counting that is solved by the systems of methods of the present invention is well defined. Notably, humans are able to perform this task relatively easily (depending on the input). The task has many applications, including for example, in high throughput biological experiments, activity monitoring, sports, and gaming. It is, therefore, not surprising that the problem has already gained some attention. However, the system of the present invention is very different from all previous work. While most previous systems were based on frequency domain analysis or on autocorrelation, the present system is based on a novel approach of cycle length estimation, turning the counting problem on its head. Moreover, (i) the only other work known to the inventors at the time of filing, that is able to work on live input, and not as post-processing applied to the entire video, are in the domain of motion capture (Mocap) sequence analysis; (ii) the problem of finding where the repetitions start and end is mostly neglected. Lastly, carefully examining the literature, no previous system was evaluated on truly unconstrained video inputs, and the vast majority were evaluated on a handful of samples that were very restricted. The ability of the present invention to perform well on a variety of real world 2D) videos including a live video feed of casual users also sets it apart from all previous work of which applications were aware at the time of filing.

Spectral or frequency domain methods such as Fourier transform based methods or wavelet analysis methods dominate current literature. See for example, A. Briassouli and N. Ahuja. Extraction and analysis of multiple periodic motions in video sequences. Pattern Analysis and Machine Intelligence, IEEE Transactions on, 29(7):1244-1261, July 2007. A limitation of such methods is that it is assumed that the action frequency would emerge as a discernible peak at a time frequency graph of one type or another. Except maybe for video sequences of simple motions or very uniform repetitions, the amount of variation in appearance between repetitions and the variation in action length means that no clear peak is visible. Similar to the present method, a time scale or other resolution parameter is either implicitly or explicitly used, which limits the range of action lengths that can be detected. In the present system, this limitation is overcome by automatically selecting in the live system between multiple detectors. In the previous literature this is mostly ignored. In addition, the frequency domain methods in the literature work on the entire video as post processing and are not supplied with a proper mechanism to identify the start and end points of the sequence of repeated actions. In the experiments performed by applicants in connection with the present invention, there was made a comparison to Briassouli et al and show that even using the best value for its parameter, selected in hindsight, separately for each video, there is a sizable performance gap in Briassouli et al. Matching can also be used for counting. In Laptev et al. ["Periodic motion detection and segmentation via approximate sequence alignment." In Computer Vision, 2005. ICCV 2005. Tenth IEEE International Conference on, volume 1, pages 816-823 Vol. 1, October 2005.] the geometric constraints arising from multiple repetitions of the same motion as the viewpoint changes are used to detect and segment repeated motions. While this may lay foundations for a counting system, counting is not performed or evaluated. 3D reconstruction using repetitions is also the focus of Ribnick et al. 2010 ["3d reconstruction of periodic motion from a single view." International Journal of Computer Vision, 90(1):28-44, 2010] and Ribnick et al. 2012 ["Reconstructing and analyzing periodic human motion from stationary monocular views." Computer Vision and Image Understanding, 116(7):815-826, 2012], with applications such as gait recognition.

Autocorrelation is employed in Azy et al. ["Segmentation of periodically moving objects. In Pattern Recognition," 2008, ICPR 2008. 19$^{th}$ International Conference on, pages 1-4, December 2008.] and applied to a handful of samples in very restricted domains. Recently, two autocorrelation systems were developed based on matching visual descriptors: (1) Ren et al. ["An efficient framework for analyzing periodical activities in sports videos." In Image and Signal Processing (CISP), 2011 4th International Congress on, volume 1, pages 502-506, October 2011], and (ii) Li et al. ["Periodic motion detection with roi-based similarity measure and extrema-based reference selection." Consumer Electronics, IEEE Transactions on, 58(3):947-954, August 2012]. While both systems display a screen shot of a counting application, the two methods are post processing methods and are only applied in specific domains on constrained videos. String matching is used in Guimaraes et al. ["Counting of video clip repetitions using a modified bmh algorithm: Preliminary results." in Multimedia and Expo, 2006 IEEE International Conference on, pages 1065-1068, July 2006] and preliminary results are shown.

One contribution that might be suitable for counting is the hierarchical motion clustering method of Zhou et al. ["Hierarchical aligned cluster analysis for temporal clustering of human motion." IEEE Transactions on Pattern Analysis and Machine Intelligence, 35(3):582-596, 2013], Given the entire video, frames are grouped to form segments of the same class of motion. Such a system could be employed to identify repeated segments of the same type. However, this is still hypothetical, requires seeing the entire video beforehand, and the system of Zhou et al. is yet to be applied to unconstrained video. Most of the methods that have been suggested exclusively for the segmentation of motion capture (Mocap) sequences, while providing useful insights on the challenges of continuous motion analysis and grouping, share the same limitations.

An online system for performing hierarchical segmentation of Mocap and 2D sequences is presented in Gong et al. ["Kernelized temporal cut for online temporal segmentation and recognition," in Computer Vision ECCV 2012, volume 7574 of Lecture Notes in Computer Science, pages 229-243. 2012]. This system, similar to the present system, employs a sliding window in time, works online, and is able to identify the borders of the repeated actions. The experiments that focused on 2D data were based on silhouettes extracted using background subtraction and the system does not seem to be robust to camera motion. Moreover, the 2D experiments apply a flat segmentation hierarchy and focus on detecting the change point between different actions such as walking, jumping, and boxing, and not on counting.

In the case that the repeated motion is from a known class and is the type of motion that has clear boundaries in time, action detection Oh et al. ["Learning and inferring motion patterns using parametric segmental switching linear dynamic systems." international Journal of Computer Vision, 77(1-3):103-124, 2008] and Hoai et al. ["Joint segmentation and classification of human actions in video." In Proceedings of IEEE Conference on Computer Vision and Pattern Recognition, 2011] can be employed. A direct counting of the detected events would then provide the desired output. While this is limited to specific cases, it has the advantage of perhaps performing better in the presence of distracting motions that are also present in the scene.

The "deep learning" concept. In at least one embodiment of the present invention there is utilized a deep neural net, such as described in Hinton et al. ["A fast learning algorithm for deep belief nets." Neural Comput., 18(7):1527-1554, July 2006] and Krizhevsky et al. ["ImageNet classification with deep convolutional neural networks." In ANIPS, 2012]. The deep neural net is utilized in order to solve a very specific classification problem—given a short video sequence, predict the cycle length of the repeated motion that it captures. The present system employs, as the very first layer, a 3D convolution. Such convolutions are natural in video processing and have been used for video action recognition. See, e.g., ii et al. ["3d convolutional neural networks for human action recognition." Pattern Analysis and Machine Intelligence, IEEE Transactions on, 35(1):221-231, January 2013]. Previous work on employing deep architectures in action recognition include: (i) Le et al. ["Learning hierarchical invariant spatio-temporal features for action recognition with independent subspace analysis." In Computer Vision and Pattern Recognition (CVPR), 2011 IEEE Conference on, pages 3361-3368, June 2011], (ii) Karpathy et al. ["Large-scale video classification with convolutional neural networks," In CVPR, 2014], and Simonyan et al. ["Two-stream convolutional networks for action recognition in videos." CoRR, abs/1406.2199, 2014].

The concept of using synthetic data in visual perception. The present system employs synthetic data for training. It is viewed as unique in that the synthetic data is unrealistic. However, training computer vision systems by using realistic or semi-realistic synthetic data is a common practice. Matikainen et al. ["Feature seeding for action recognition." in Computer Vision (ICCV), 2011, IEEE International Conference on, pages 1716-1723, November 2011] generated synthetic action sequences from motion capture data, using a computer graphics human model. Recently, Chen and Grauman ["Watching unlabeled video helps learn new human actions from very few labeled snapshots." in Proceedings of the 2013 IEEE Conference on Computer Vision and Pattern Recognition, CVPR '13, pages 572-579, 2013] were able to create synthetic clips of human action by integrating labeled still images with unlabeled human action video. In Pishchulin et al. ["Learning people detection models from few training samples." In Computer Vision and Pattern Recognition (CVPR), 2011 IEEE Conference on, pages 1473-1480, June 2011], computer graphic human figures were placed on background images to create a training set for pedestrian detection. In pose estimation, realistic computer graphics datasets are very successfully used in order to train pose recognition systems. See, e.g., Shotton et al. ["Real-time human pose recognition in parts from single depth images." In Proceedings of the 2011 IEEE Conference on Computer Vision and Pattern Recognition, CVPR '11, pages 1297-1304, Washington, D.C., USA, 2011] and Grauman et al. ["Inferring 3d structure with a statistical image-based shape model." In Computer Vision, 2003. Proceedings. Ninth IEEE International Conference on, pages 641-647 vol. 1, October 2003], Recently, state of the art results in text detection were achieved using a DNN trained on synthetic text examples. See Jaderberg et al. ["Synthetic data and artificial neural networks for natural scene text recognition." CoRR, abs/1406.2227, 2014].

All reference cited herein are hereby incorporated by reference.

Beginning with FIG. 1, references is made to exemplary sequences which include, (i) (first row) a frame from the video; (ii) (second row) the heat map of the matrix $E_2$ used in order to detect the Region of Interest [ROI] and the estimated ROI; and (iii) (third row) the 20 non sequential frames as passed to the DNN classifier. The heat map is shown before thresholding as addressed in more detail below.

The Method Overview. The present method is broken down into two components for clarity: (1) the core system that is used to perform counting, and (2) the outer system that decides when to start and stop counting and selects between multiple time scales.

In the preferred embodiment, the core system analyses blocks of 20 frames at a time. The ROI is detected automatically for each block independently of the other video blocks as described below. The ROI is then resized to a size of 50×50 pixels resulting in video blocks of size 50×50×20 as depicted in FIG. 1. This block is then passed to a DNN, which is used to estimate the cycle length in this video block.

As mentioned, this classifier is trained on a set containing tens of thousands of synthetic examples. These are generated at random using one of four motion patterns, each with its associated set of random parameters.

The classification output, both the predicted cycle length and its associated certainty, is integrated over time by using a moving average scheme.

The outer system is further described below. The core system above is applied to the video at multiple time scales, simply by sampling the input frames in time. The selection among the counters is done by examining the entropy of the probabilities assigned by the underlying DNNs. The lower the entropy, the higher the confidence we have in the result of the DNN classification. The same entropy is also used to determine where to start and stop the counting. A simple state machine based on this entropy detects that a repetitive action has possibly started, and if the entropy remains below thresholds for a set number of seconds, it performs counting. The count-end event is detected similarly, and following a correction, if necessary, to the last count, the system is reset and is able to start a new count.

The problem of predicting, per video block, the cycle length is treated as a classification problem and not as a regression problem. This design choice is based on the observation that time filters that capture repetitions every 1 frames are very different from those meant to capture repetitions every 1+1 or 1−1 frames. This creates a favor circumstance for the present method—the various discrete states are well distinguishable. In applicants' experiments, there was provided an empirical comparison to a very similar DNN, where the output layer is optimized to perform regression, showing that classification considerably outperforms regression.

Moreover, the extensive use made of entropy in the live system, both to select the appropriate time scale and to detect the boundaries of the action, is only possible within a multiclass classification problem. Presumably, other certainty measurements could be used for employing regression, but these would require an additional computational effort or a more complex network structure.

The classification approach by itself is not without limitations. The cycle lengths in the data itself are not integers, but in practice the system seems to be robust to such rounding effects, since each cycle is captured by multiple sliding windows of the same detector that are all integrated in time. Moreover, since multiple detectors are used, the same range of cycle lengths (in seconds) is often captured by multiple detectors that quantize the cycle length at multiple resolutions. Another challenge, shared by both the classification and the regression approaches, is that a cycle length of 1 also defines cycle lengths of n1, where n is an integer. It appears that the most rapid cycle length is the one that often gets counted. The reason is that shorter cycles are supported by more evidence and are therefore typically associated with higher probabilities.

Synthesizing data. The synthetic data used for training follows four patterns, all displaying squares of a low frequency pattern moving in front of a white noise background. Three to five such squares are present in every frame, all with random sizes, and all move following the same motion pattern but with different random motion parameters. The labels denote the cycle length, which is fixed for each created synthetic sample. The first pattern is of linear motion along a path of random length with a jump back to the starting location after the cycle length number of frames. The second pattern is of a circular motion along a path ending at the starting position every cycle length frames; the radius is set at random. The third pattern is of expanding and shrinking in a cyclic manner independently in both axes. The fourth and last pattern displays in place rotation up to a certain degree and back to the starting rotation at the end of the cycle. To add variability, sequences are also created in which the patterns are randomly mixed within the same sequence.

Figure 2:
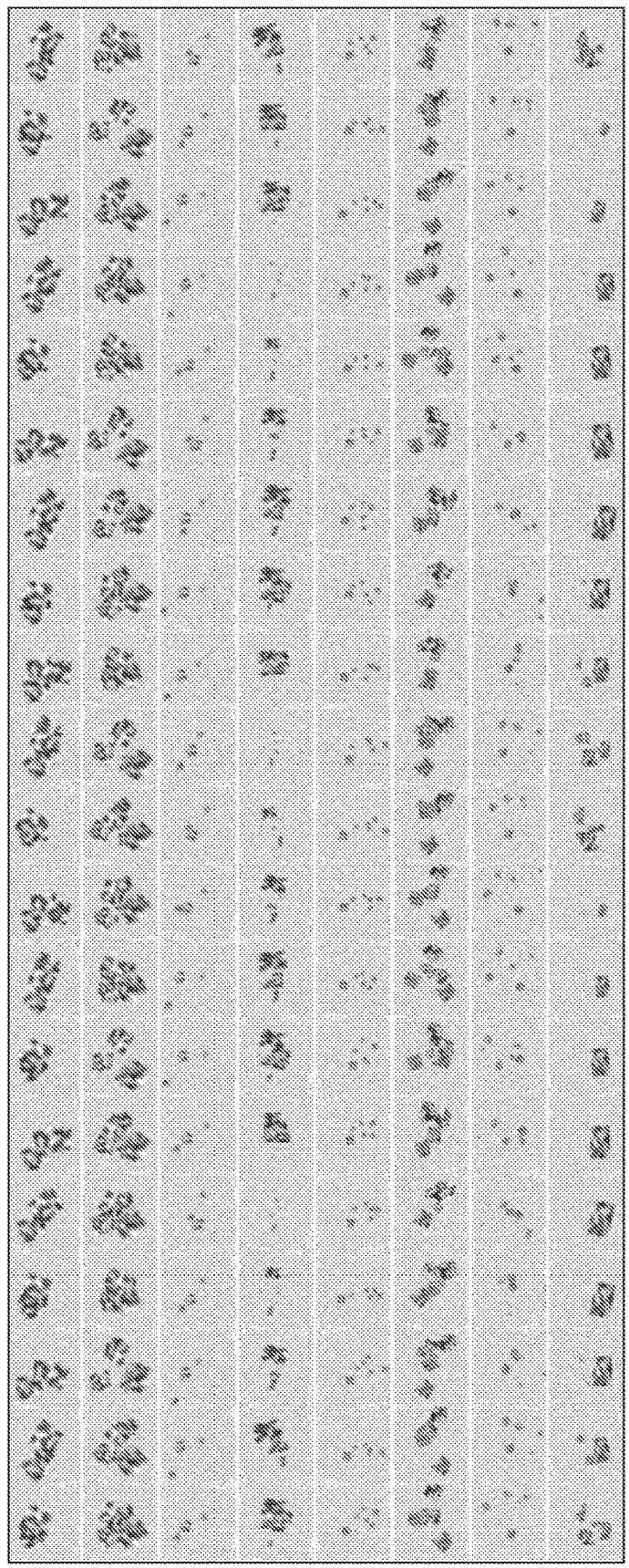
FIG. 2 is a set of samples of synthetic sequences for cycle lengths ranging from 3 (top row) to 10 (bottom row), with each row a sequence from one of the 4 types used to synthesize data, showing a large variability in the size of the moving squares used.

FIG. 2 depicts samples of synthetic sequences for cycle lengths ranging from 3 (top row) to 10 (bottom row). Each row is a sequence from one of the 4 types used to synthesize data. As can be seen, there is a large variability in the size of the moving squares used.

Figure 3:
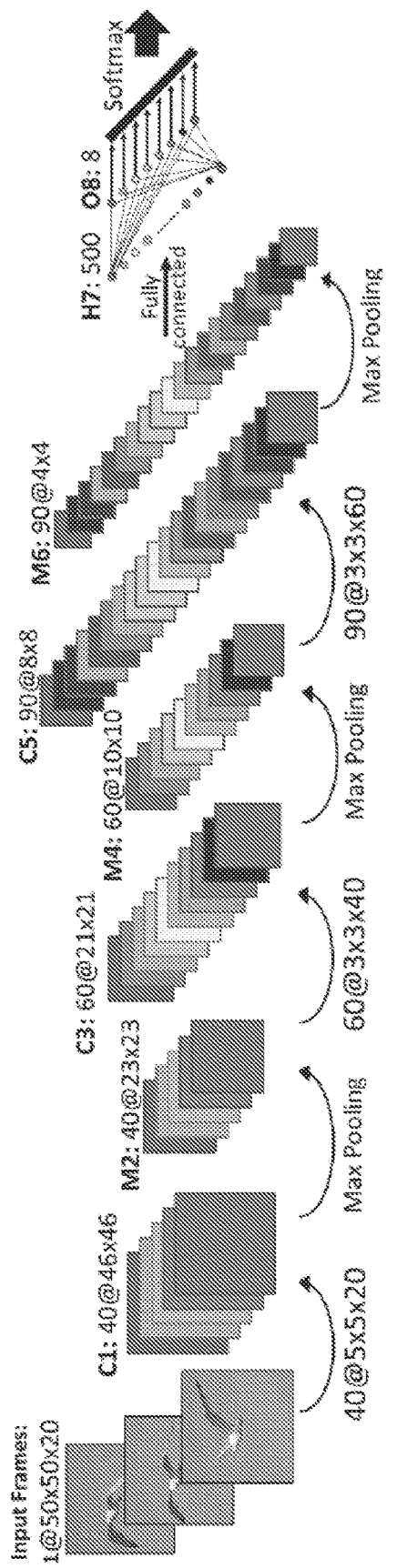
FIG. 3 is an outline of the architecture used in one embodiment of the present invention, showing a front-end of a single 3D convolutional-pooling layer, followed by interleaving convolution/maximization layers and finally a fully-connected hidden layer followed by a softmax layer.

FIG. 3 depicts an outline of the architecture used in for the present system. A front-end of a single 3D convolutional-pooling layer, followed by interleaving convolution/maximization layers and finally a fully-connected hidden layer followed by a softmax layer.

The location of the center of each square is shifted independently at each frame from the predetermined cyclic path, by uniformly and independently sampling the amount of shift in a fixed range. In addition, a global rotation of the frame, taken uniformly from −20° up to 20°, independently to each frame, is applied to half of the sequences. This simulates global camera motion.

All synthetic sequences contain 20 frames of size 50×50. Cycle lengths in the range of 3 . . . 10 are used during training, Examples of sequences are shown in FIG. 2.

In the training process, 30,000 random training sequences are used, as well as 5,000 validation sequences. These numbers are within the range that appears in the computer vision literature for DNNs. While object recognition systems are often trained on ImageNet's million images, other systems use a comparable number.

DNN architecture and training. According to at least one embodiment of the present system, the DNN is trained to classify the cycle length within a fixed number of frames. The overall architecture is shown in FIG. 3. The input is a 3D tensor of size 50 by 50 by 20 capturing a fixed ROI taken across 20 (non-consecutive) frames and resized to 50 by 50 pixels. This is denoted by 1@50×50×20, since there is utilized a single channel gray image.

The input is given to a convolutional layer (C1) with 40 filters of size 5×5×20. This layer encodes temporal patterns across the entire 20 frames. The resulting 40 feature maps of size 46 by 46 (by 1) are no longer 3D tensors. Since repetitive motion is a long-range phenomenon, performing repeated 3D convolutions over shorter ranges in time would not be beneficial. These 40 feature maps are then fed to a max-pooling layer (M2) which takes the max over nonoverlapping 2×2 spatial neighborhoods, separately for each channel, resulting in a representation of size 40@23×23. This is followed by a 2D convolutional layer (C3) that has 60 filters of size 3×3×40. M4, the next max-pooling layer is similar to M2, and results in an output of 60@10×10.

The final convolutional layer (C5) employs 90 filters of size 3×3×60: the number of filters was increased in an attempt to keep the number of output neurons in the subsequent M6 similar to M4. The last maximization layer, M6, also employs 2×2 neighborhoods, one channel at a time. While most of the computation is done in layers 1-6, they only contain a small part of the overall parameters. The output they produce, of size 90@4×4 has a low spatial resolution, which makes sense since the phenomenon aimed to be capture is global across the entire frame.

The top two layers, the hidden layer H7 and the output layer O8 are fully connected: each unit is connected to all units of the previous layer. The size of H7 is taken to be 500, which seems to be sufficient to represent the space of motion repetitions for limited sized blocks. The output size contains one neuron per 8 possible classifications corresponding to the 8 cycle lengths from 3 to 10.

After each convolution-maximization pair, and after the hidden layer H7 and the output layer O8, a learned activation bias (one per channel) is added and the Rectified Linear Unit (ReLU) is then applied. The output of the last layer is fed to a K-way softmax (where K=8 is the number of classes), which produces a distribution over the class labels, i.e., let $o_i$ be the i-th output of the network on a given input, the probability assigned to the i-th class is the output of the softmax function: $p_i = \exp(o_i)/\Sigma \exp(o_j)$. During training, the cross-entropy loss is used. If k is the index of the true label for a given input, the loss is: $L = \log p_k$. It is minimized over the parameters by computing the gradient of L with respect to the parameters and by updating the parameters using the stochastic gradient descent method. The gradients are computed by standard back-propagation of the loss. The learning rate is fixed at n=0:002 throughout the training process.

The implementation is done using the Theano numerical computation library.

Detecting the ROI. In many videos, the motion to be detected occurs only in a relatively small part of the image. Therefore, given a block of 20 non-consecutive frames, a rectangular ROI is first computed that is aimed at capturing the majority of the observed motion. This computation may result in a shifting ROI between blocks. For the videos in the YouTube benchmark (see below), this seems to be an advantage and there was observed no negative outcomes from this. However, for users freely interacting with the live system, the presence of multiple random persons entering the scene poses a challenge.

In order to compute the bounding box of the action, a static camera is assumed. Let the tensor T hold the pixels of a single 20 frame video block of size W×H×20. The first step is to compute a 2D map containing the standard deviation along the third dimension of T This map, if thresholded at its mean value, produces a binary map E. The map E is convolved with a square all-ones kernel of size 10×10. A second threshold is applied at the value of 80 to produce a second binary map $E_2$. It contains all pixels for which 80% of the 10×10 neighborhood in E have a value of +1.

The ROI is computed separately to the two axes. Let $\{i_k, j_k\}_k$ be the set of coordinates of all +1 values in $E_2$. The ROI boundaries along the x-axis (y-axis) at the 3rd and 97th percentiles of $\{i_k\}(\{j_k\})$.

This simple heuristic, shown in FIG. 1, was found to be effective enough for a wide range of video sequences. The second example of this figure depicts an example in which a human would mark the bounding box differently. The automatically selected ROI contains the moving shadow. While specialized modules can be added to deal with such artifacts, we opt for the simplest solution, pointing to the robustness of our overall design. In addition, when the camera is moving, the assumption behind the ROI computation is violated and the ROI becomes the entire image sans a thin margin. As demonstrated experimentally, the other components of the counting system work well even in such cases.

Integration of counts. While in practice multiple detectors are employed at multiple time scales, for clarity, the exposition of the counting integration system begins with a description of a single detector that collects blocks of 20 frames from a video segment of length 20N frames. After the computation of the ROI, the DNN classifier is applied to the video block resulting in a classification label and an associated probability. This process of collecting 20 frames and producing a label is repeated every N frames, to match the gap between sampled frames. These readings are then integrated in order to produce an online counter.

Every video block (20 frames) produces a label) ŷ and the associated probability $p_ŷ$ computed by the softmax function (see above), Naturally, they often deviate to some extent from the actual cycle length. In order to produce a more robust count, the information from multiple video blocks is integrated. As described below, the term frames is used to mean sampled frames, i.e., the distance in time between every two consecutive frames is N frames of the input video.

The integration module works online and holds three variables that are updated after each video block is analyzed: R, which is the current repetition count and holds the estimated number of repetitions from the motion's start; L, which is the current estimation of the cycle length, computed by integrating multiple classification results; and C which is a frame counter that holds the number of frames since the last update of R.

In an ideal scenario in which there are no classification errors and no fluctuations in the cycle length, after the first video block in which motion is identified, L is set to the recovered cycle length, the counter R is set to [20/L], and C is set to 20−L·R. After the analysis of the next block, the frame counter is advanced C=C+1. It is noted here that frame indices are omitted and there is use a conventional programming language assignment notation, i.e., we avoid writing explicitly $C_{t+1}=C_t+1$. Thus, both L, R would remain unchanged unless C equals L. In this case, the count is incremented R=R+1 and the frame counter is reset to C=0. This process is repeated for every subsequent video block.

In practice, L changes dynamically during the video, and, in addition, the classifier can output the wrong label. In order to deal with this situation, we change L dynamically, employing a moving average update rule that depends on the confidence of the classifier, i.e., it depends on both ŷ, the predicted cycle length, and the estimated probability $p_{\hat{y}}$. The update rule is given as: $L+\alpha\hat{y}+(1-\alpha)L$, where $\alpha$ is a piecewise constant function of $p_{\hat{y}}$. When $p_{\hat{y}}$ is larger than 0.9, $\alpha$ is set to 0.7; when $0.8 \leq p_{\hat{y}} < 0.9$, $\alpha=0.5$; when $0.5 \leq p_{\hat{y}} < 0.8$, $\alpha=0.2$; otherwise, we have little confidence in the obtained value of and $\alpha=0$, i.e., in this case, no update is performed. This update rule allows for rapid adaptation of the estimated cycle length when the confidence is high. In our experiments, we also evaluated systems in which a is taken as constant.

Figure 4:
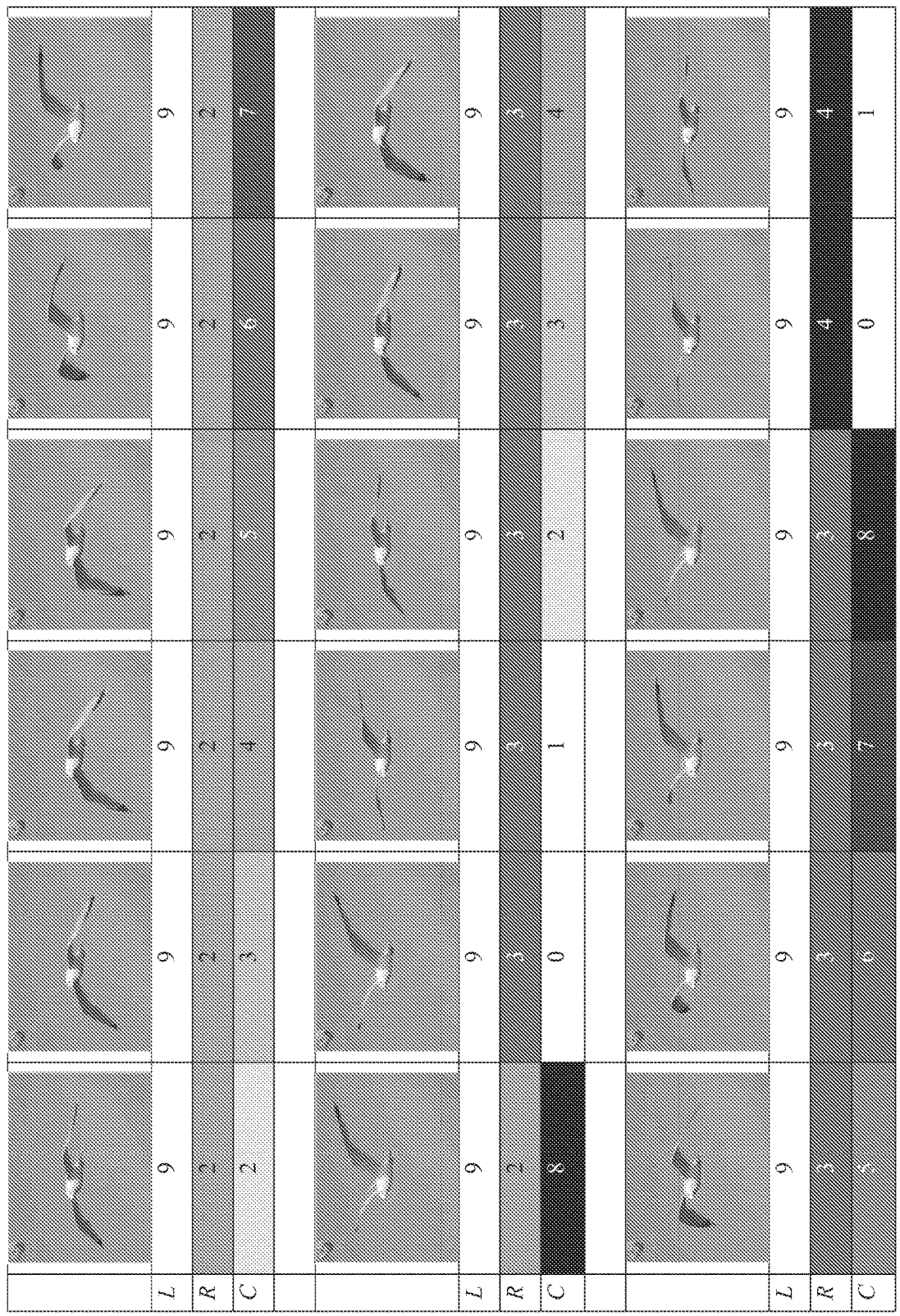
FIG. 4 is an example of the count integration process, utilized in one embodiment of the present invention, for a single detector, showing the frames from the beginning of each video block, the current estimation of the cycle length L, the number of repetitions seen so far R, and the variable C that holds the numbers of frame strides since the last update of R.

FIG. 4 illustrates the count integration process. Note the importance of the first block. In fact, many of applicants' mistakes were by a shift of one missed count or the addition of one superfluous repetition and directly stem from the first motion reading. This reading is not averaged with the classification of other blocks and is, therefore, more error prone. As future work, a mechanism to validate the first count in retrospect can be added.

Working in multiple time scales and handling intro and outro video segments. At every time point, the system inspects 20 frames that are sampled uniformly every N frames. The parameter N should be set in accordance with the expected frequency of motion. The DNN classifier outputs cycle lengths between 3 and 10 frames, which translate to a repeated action of a duration ranging from 3N=30 seconds to 10N=30 seconds, assuming 30 frames per second.

FIG. 4 depicts an example of the count integration process for a single detector. Shown are the frames from the beginning of each video block, the current estimation of the cycle length L, the number of repetitions seen so far R, and the variable C that holds the numbers of frame strides since the last update of R. This example shows a relatively clean case in which there was little variation in the true and the estimated cycle length. In the first video block, ŷ and therefore L are estimate to be 9, therefore R is set to 2 and the register C is set to 20−2*9=2. The system then continues from one video block to the next. A count is added to R when C≤L.

It is suggested to employ multiple detectors working at different time scales. In applicants' experiments, the multiple values of N were set to be 2, 5, and 8. This range of possibilities was set to capture the rapid, moderate, and relatively slow actions observed in the data. Naturally, more detectors could be added in order to provide a wider coverage.

Note that since the low range of one detector can overlap the high range of another, the same cycle length in seconds is observed by multiple detectors. For example, for the three detectors employed, the rapid and the moderate detectors share the range 0.5-0.66 seconds, while the moderate and slow detectors share the range of 0.8-1.66 seconds. Overall, almost half of a unified range of 0.2-2.33 seconds per cycle is covered by more than one detector.

Each detector provides for each video frame a vector of probabilities derived from the softmax layer $p_i$, i=3 . . . 10. During training, these probabilities were optimized to minimize the cross-entropy loss and therefore would maximize the log probability of the correct class. It was found that the entropy of the predictions $H(p)=-\Sigma_i p_i$ is a useful uncertainty score. When it is low, the detector is much more likely to provide the valid cycle length. It is, therefore, recommended to use the entropy extensively in the system in order to decide if a repeated action is actually taking place and at which time scale. Note that this is the first usage, know to applicants at the time of filing, of the entropy of classifier predictions as a direct signal in a live working system. This is only made possible through the high accuracy of the underlying classifier.

Off-line selection of the time scale. In the experiments for which one detector is selected per video, the analysis is done offline for the entire video. The detector that gives the lowest average entropy is selected. Counting for each detector is performed independently as described above.

Live selection and integration of multiple time scales. To perform live counting with three concurrent detectors, a global counter is held, in addition to the registers L, R, and C held per detector. The three detectors employed provide estimations every 2, 5, or 8 frames. Every 40 frames all three provide estimations at once and synchronization are performed. The average entropy of the detectors is compared: for the rapid counter 20 measurements are averaged, while for the other two only 8 or 5 exist.

The detector with the lowest entropy is selected and the count difference in this counter from the reading 40 frames ago is added to the global counter. The individual counters R of the three detectors are zeroed, and the frame counters C of the two detectors that were not selected are updated such that the time length since the last repetition is similar. For example, if the moderately rapid detector was elected and the value of the C register is 6, this translates to new value of C of 6*5/2=15 for the rapid detector, and only 6*5/8≈4 for the slow detector. Since these updated values possibly contain more than one repetition at the currently estimated cycle length, the C is taken modulo the currently estimated cycle length. If for example, the currently estimated cycle length of the rapid detector is 6, then the new value of C is updated to be 15 mod 6=3.

In order to keep the counting live in between synchronization points, the last selected detector updates a separate live counter shown to the users. At the synchronization point, when the selection of the lowest entropy detector in the last 40 frames is performed, the live counter is updated to match the global counter. This very rarely changes the value of the live counter.

Repeated action start and end. A moving average over the last 7 entropy readings is kept for each detector, and the minimal value of the three smoothed entropies is considered. An entry threshold of 1.1 on this value is used to alert the system of the possibility of repetitions. The user is then alerted that a new possible repetitive action is taking place ("new hypothesis"), and the current count is displayed. Since sometimes there is a transient drop in entropy, if within the first 4 repetitions or 4 seconds (whichever is first) the smoothed entropy rises above that threshold, the count is terminated. If the entropy stays below the threshold, the user is presented with a permanent counter.

Figure 5:
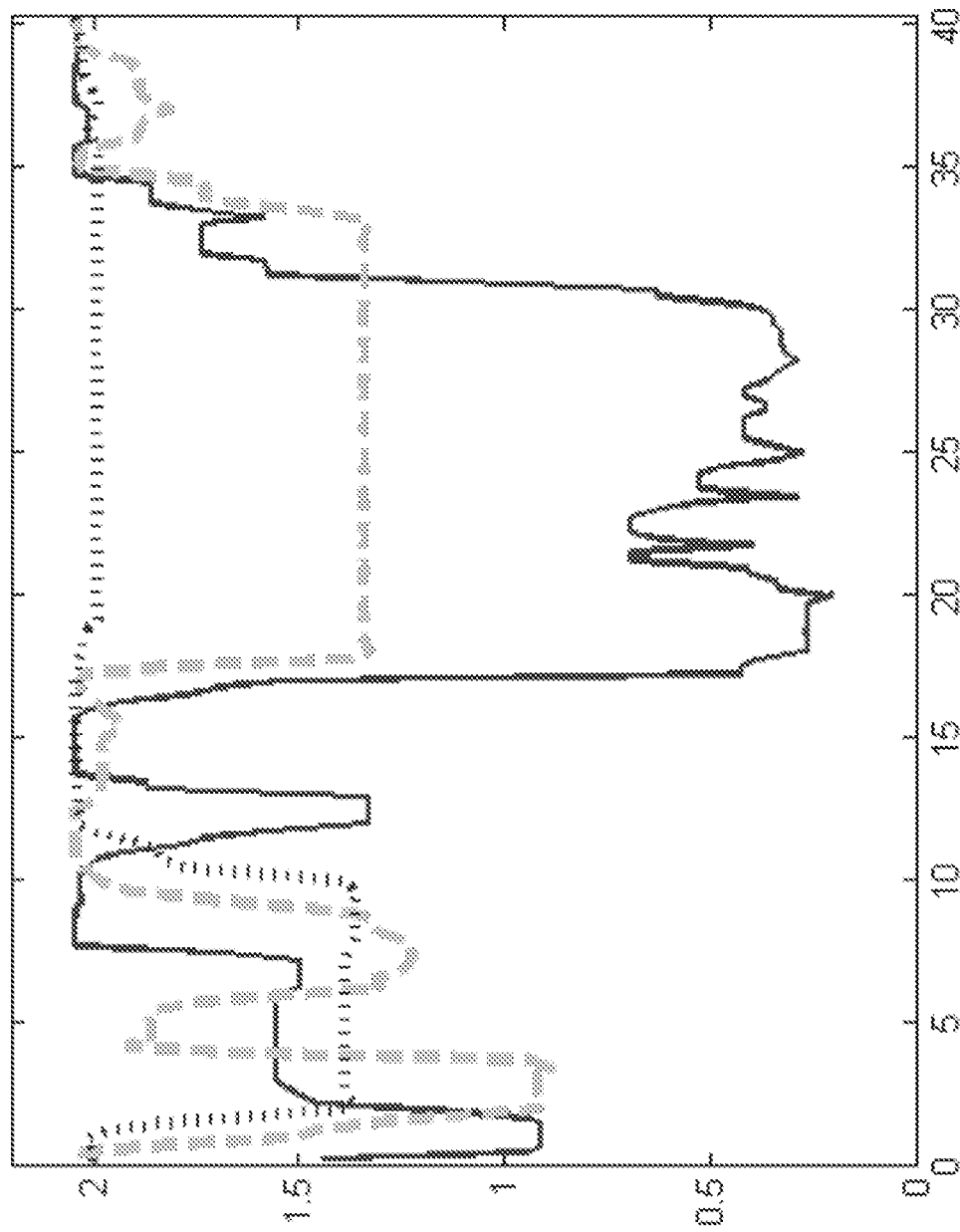
FIG. 5 is a graphical depiction of smoothed entropies of the three detectors as a function of time (in seconds), as utilized in one embodiment of the present invention, showing solid red, dashed green, and dotted blue lines corresponding to detector parameter N of values 2, 5, 8 respectively.
Figure 6:
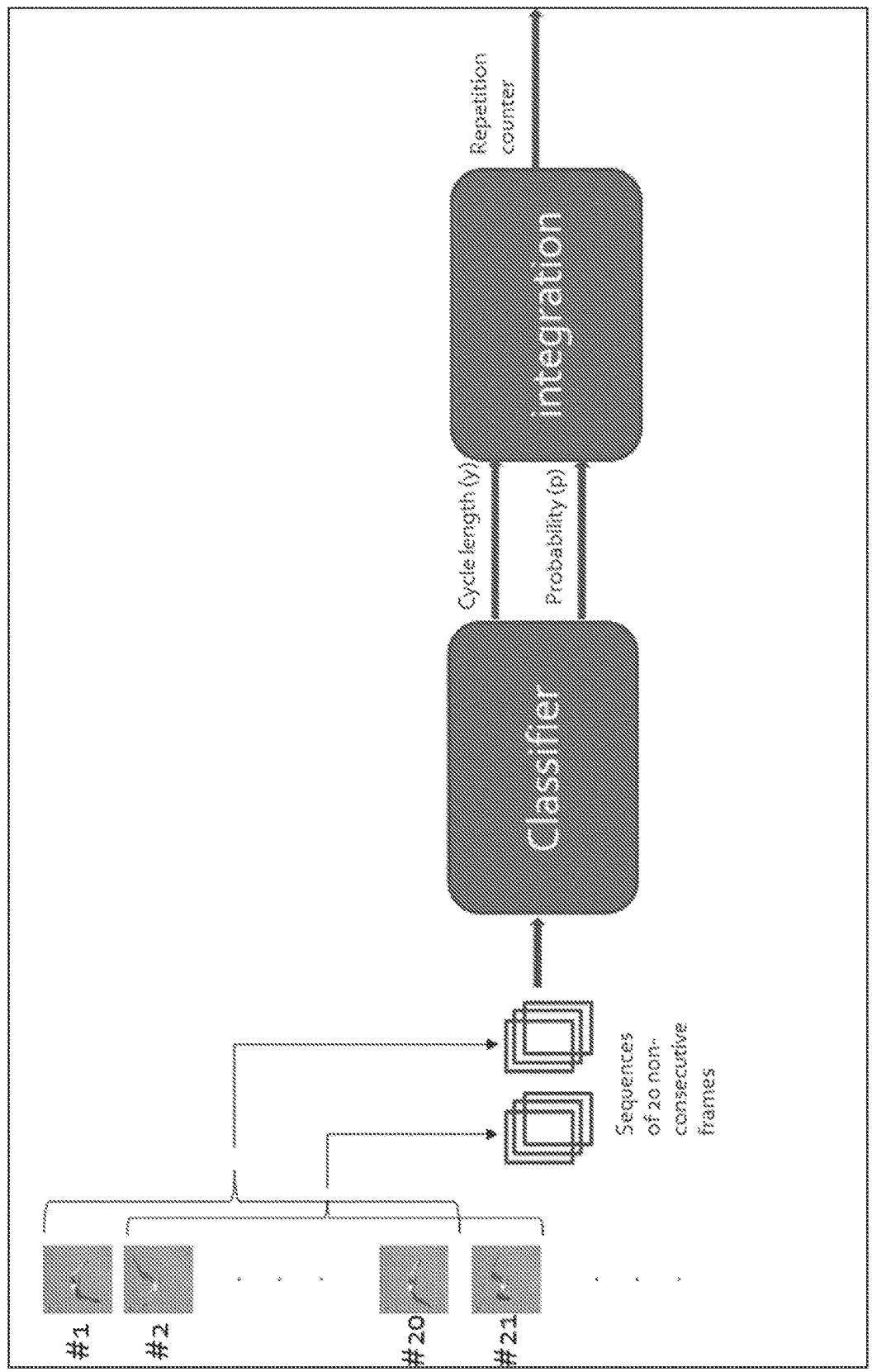
FIG. 6 is a schematic view of one embodiment of the repetitive activity detection and counting system disclosed herein.
Figure 7:
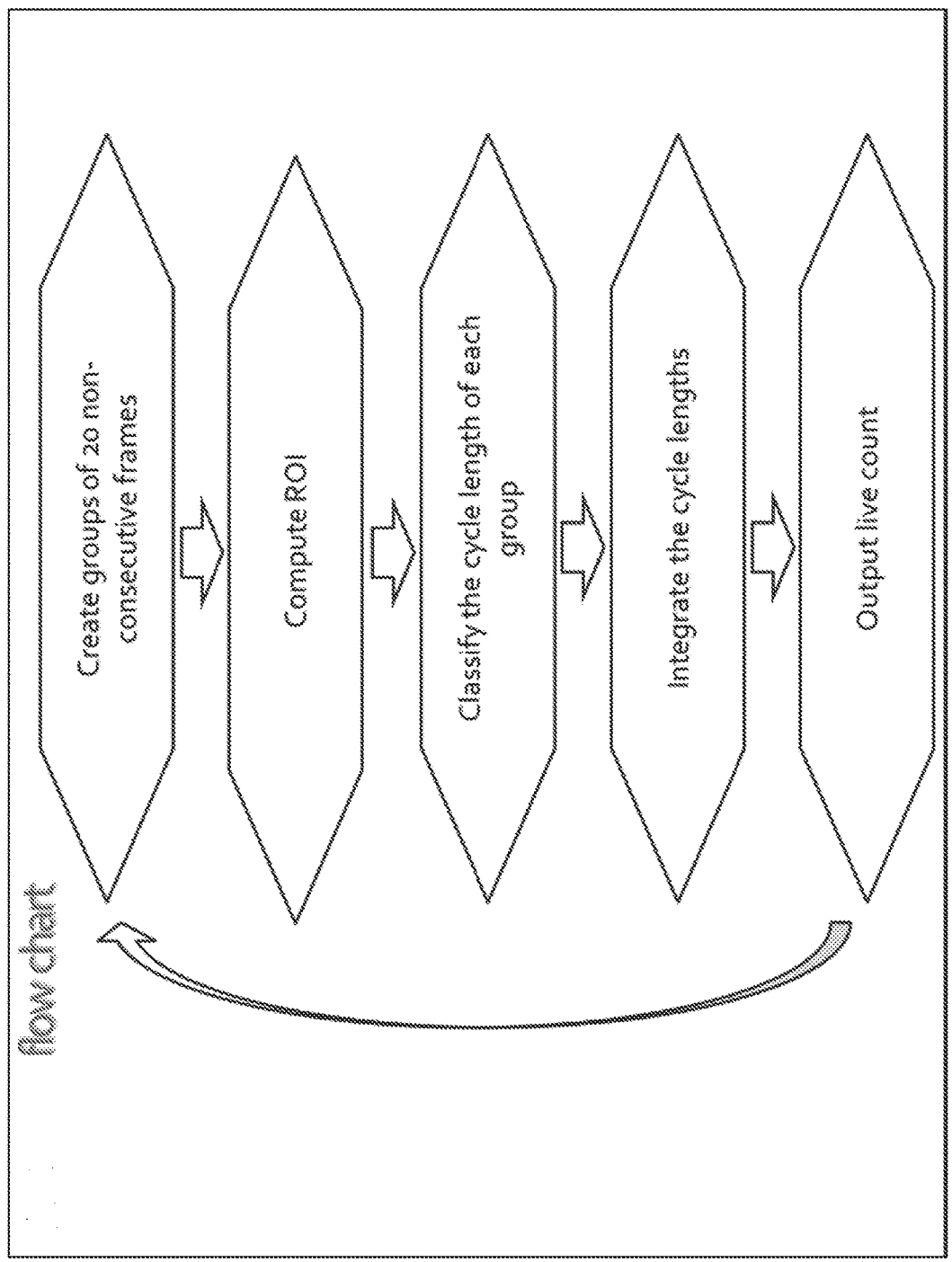
FIG. 7 is a simplified flow chart of one embodiment of the repetitive activity detection and counting system disclosed herein.
Figure 8:
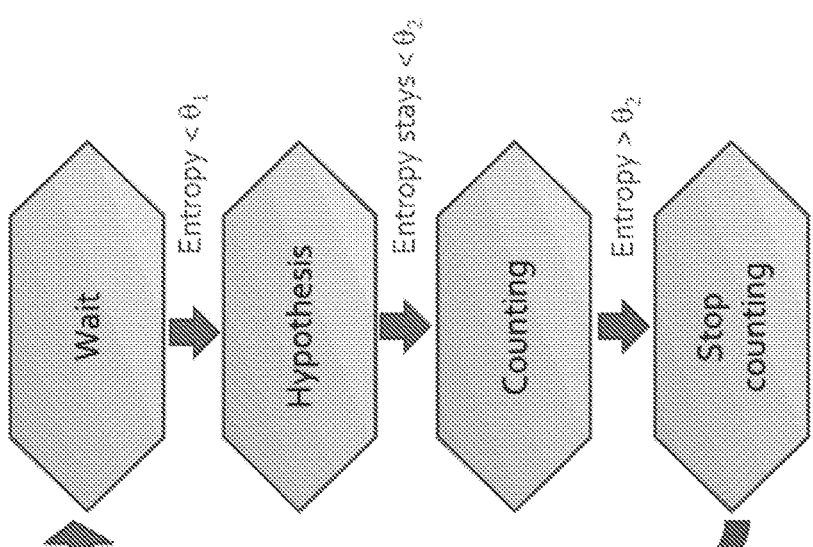
FIG. 8 is a schematic depiction of the four states of one embodiment of the repetitive activity detection and counting system disclosed herein.
Figure 9:
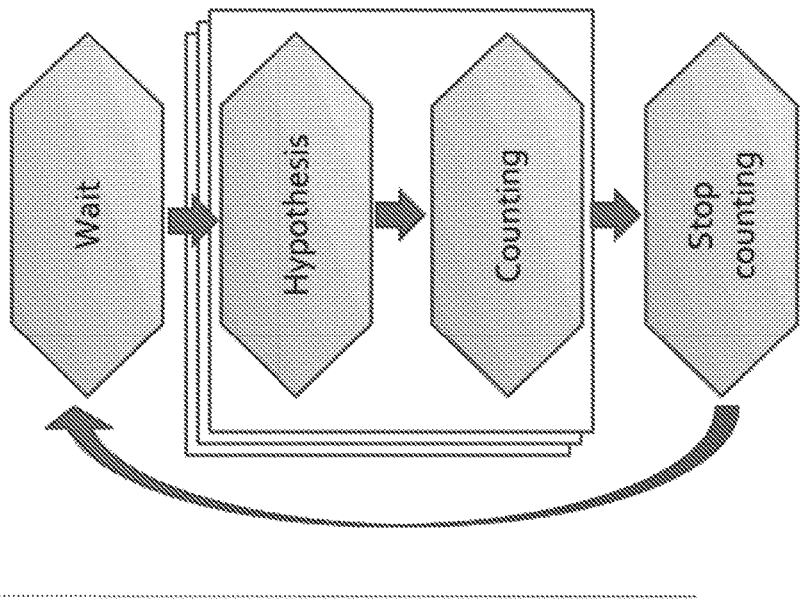
FIG. 9 is a schematic depiction of how counters interact within the four states of one embodiment of the repetitive activity detection and counting system disclosed herein.

FIG. 5 depicts the smoothed entropies of the three detectors as a function of time (in seconds). The solid red, dashed green, and dotted blue lines correspond to detector parameter N of values 2, 5, 8 respectively. The rapid detector (N=2) crosses the entropy threshold of 1.1 at the beginning of the video, but does not remain low enough to create a count. It passes this threshold again at time 12 sec., and counting is initiated. At time 31 sec., the detector's entropy rises above the exit threshold of 1.3 and counting stops.

The minimal smoothed entropy among the three detectors is also used to stop the counter. An exit threshold of 1.3 is used. Since the entropy is smoothed in time, the counting will often stop with a slight delay. To fix this, the history of the relevant unsmoothed entropy is examined, and the point of maximal change in entropy is detected. Then, the count at this specific point in time is taken as the final count. This means that sometimes, at the end of the count, the counter rewinds by one count, which is not entirely desirable. An alternative would be to display counting with a slight delay. The smoothed entropies for one sample video are displayed in FIG. 5. The video clip starts with low entropies for two of the detectors, but this drop is not long enough to maintain a count, only to alert regarding a possible count. At the middle of the clip, the entropy of the rapid detector drops below the threshold again and remains low until it crosses the exit threshold 15 seconds later.

Once the counting stops, the system automatically looks for a new counting event. The entire process is completely automatic and the system runs live for hours at a time. One modification is made to handle cyclic image noise. In many cases, low entropy would appear in a motionless scene. This is caused by camera artifacts and is easy to eliminate simply by turning off the system if the sum of the standard deviation of the image pixels is below a threshold.

Experiments. Experimental results covering the various aspects of the system are provided herein. The evaluation is performed on very diverse sets of challenging real world videos, containing camera and background motion and depicting complex actions that differ in length and in appearance between repetitions. Note again that the real videos are used only for testing and do not take part in the training process. The same system is used throughout the experiments unless otherwise noted.

Training on the synthetic data. Training stopped, via an automatic early stopping mechanism that stops the training process once the validation error stops decreasing, at epoch 102. Each epoch took 3 minutes on a NVIDIA GTX580 GPU system. During training, the validation error decreased from 87% to 8.5%. Note that this error is per video block and not the counting error reported below.

The YouTube benchmark. For the purpose of benchmarking, a dataset of 75 videos containing repetitions was collected, the vast majority of which are from YouTube. This test dataset displays a good mix of domains, including exercising, cooking, building, living creatures, etc. In order to create a clean benchmark from a very diverse set of videos, the videos are presegmented to include only the repeated action, and this benchmark is not used to test the accuracy of detecting motion start and end. The individual repetitions in 30 benchmark videos is manually marked and it is discovered that the average value of the ratio of the difference between the longest repetition and the shortest repetition over the mean repetition length is 0.32, indicating that the benchmarks display a large variability in repetition length.

Extended evaluations are performed using the benchmark. As the main metric, the fraction in percent of the absolute difference in counts between the ground truth G and the estimated count R over the ground truth are used: $100^{|G-R|}/_G$. Three strategies for choosing the smoothness parameter a are compared: $\alpha$ is either a function of $p_{\tilde{y}}$, or fixed at 0.5 or 1. Since the simplest strategy of $\alpha=1$ seems to outperform the other methods, this choice is fixed in subsequent experiments that evaluate the system without the ROI detection mechanism, or evaluate a system in which classification is replaced by regression. An upper bound on the performance of the method of Briassouli et al, is also reported, where the original code is used and the best pseudospectrum parameter is selected for each movie separately such that the test error is minimized. Lastly, the system is evaluated on a subset of the 75 videos which contains 30 videos of considerable camera motion.

The systems are evaluated (where appropriate) for the manually selected detector, the offline selection of detector based on mean entropy in the video, and for the online selection of detector. Also shown is the error for the median count out of the three counters.

Table 1 below shows the error rates on the benchmark. Mean±Standard Error of the absolute error in percents are shown, i.e., the statistics of $^{|G-R|}/_G*100$, where G is the ground truth count for a specific video, and R is the estimated count. The first three columns correspond to the full system where a was taken as a function of $p_{\tilde{y}}$ or held fix at 0.5 or 1. Two variants of the system are evaluated at $\alpha=1$, one with the entire frame as ROI and one where multiclass classification is replaced by regression. The method of Briassouli et al. is used with the best possible parameter chosen per video based on the comparison to the ground truth. Lastly, the results of the full system with a fixed at 1 are shown for the moving camera subset. The rows correspond to manual selection of the best time scale, and offline selection of the time scale based on the average detector entropy, a dynamic online selection of the time scale, and just taking the average of the three detectors. The regression based system does not allow for entropy based selection among the detectors.

TABLE 1

| method | Entire youtube benchmark (75 videos) | | | | | | Moving camera |
| --- | --- | --- | --- | --- | --- | --- | --- |
| | $\alpha = f(p_{\tilde{y}})$ | $\alpha = 0.5$ | $\alpha = 1$ | no ROI | regression | [5] | $\alpha = 1$ |
| Manual selection | 4.87 ± 0.78 | 4.90 ± 0.75 | 3.05 ± 0.79 | 3.23 ± 0.93 | 10.53 ± 1.40 | 29.80 ± 4.61 | 3.13 ± 0.79 |
| offline selection | 7.63 ± 1.27 | 7.66 ± 1.29 | 6.25 ± 1.49 | 8.12 ± 2.18 | N/A | N/A | 6.58 ± 1.43 |
| online selection | 8.30 ± 1.17 | 8.38 ± 1.19 | 7.03 ± 1.37 | 9.58 ± 2.21 | N/A | N/A | 7.35 ± 1.14 |
| median | 20.38 ± 3.19 | 19.99 ± 3.14 | 20.22 ± 3.60 | 22.08 ± 3.59 | 31.95 ± 3.10 | N/A | 19.14 ± 3.45 |

The results reported in Tab. 1 above, overall, show that the counting process is accurate with an average error being around 8% for the online automatic selection of the time scale. Naturally, when the selection is done offline or given by an oracle, accuracy further improves. It is evident that the automatic ROI selection is beneficial. Surprisingly, it seems that the two constant values of a outperform the dynamic scheme. Since this dynamic scheme was designed manually by inspecting the first obtained results, a better dynamic scheme might be devised in the future. We refrain from fitting a better function in order not to overfit our benchmark. Classification greatly outperforms regression, possibly due to the reasons recited above. Note that automatic time scale using entropy cannot be evaluated for the regression scheme. The baseline literature method, despite using hindsight-based selection of its parameter does not perform well on our benchmark. The subset of videos for which there is a significant camera motion does not seem to be more challenging than the entire benchmark.

Benchmarking the live system. The system was presented in the hall outside a large public event, where users were free to interact with the system with minimal or no guidance. The overall feedback was extremely positive and the system seemed to count well almost the entire repertoire of actions performed by the users. Two challenges that are not dealt with in the current system were identified: first, the system was not robust enough to deal with multiple persons entering the frame; second, some users tried minute actions, which were below the system's identification threshold.

In order to evaluate the live performance of the system, a separate 45 minute long live continuous video was collected and the results annotated. Overall, out of 54 actions performed, one was missed and the rest were correctly detected. The counting of these 53 action was performed with an average absolute error of 7.1%. There has been 20 cases of retracting the last count, out of which 6 increased the error. The action always started very closely to the actual start, except for one instance when it started 2 seconds later. Note that the live video does not display the starting point since until repetitions take place, the repeated action cannot be detected. What is presented to the user is the new hypothesis message, followed by a counter message 4 repetitions or 4 seconds later. The shift in the start time is estimated in retrospect. The absolute shift in the end point was 0.5 seconds on average. Within the video there were many non-repetitive motions and the system made 4 false positive counts, all in a range of less than 5 repetitions.

Identifying repetitions in video is harder than it seems at first glance. The motion of interest can be limited to a portion of the frame and the cycle length can vary dynamically. Previous systems provided very limited solutions and were never evaluated thoroughly. In the present invention, it is shown that a DNN based system can integrated into an online system to count repetitions robustly. The proposed system is novel at almost all levels, including, for example, the online design, the use of a sliding classifier for counting video repetitions, the use of convolutional deep neural networks in such a framework, the reliance on purely unrealistic synthetic data for training the system, changing the state of the system based on entropy, automatically working at multiple time scales, and more.

Unlike previous work, the method runs online and does not need to view the entire video in order to count repetitions. Currently the data of previous frames are not stored, however, a verification step that revisits the video history and validates the count might further improve the results.

The high accuracy of the DNN classification allows for the use of the entropy of the per video-block predictions as a clear signal that determines the high-level state of the system. Equipped with a robust way to start, end, and select time scale, the system is robust enough to interact freely with uninstructed users in one continuous live session. The experiments recited herein are not limited to the case of a static camera. The reliance on short blocks of video and the independence of the analysis from one block to the next makes the system perform well on videos with a moving camera. Finally, it is demonstrated convincingly that the generalization capability that DNNs can be effectively exploited in order to learn from a synthetic dataset of completely unrealistic frames. One can imagine that in a future in which computers are able to approach the generalization capability of humans, computer vision practitioners would define visual concepts by means of sketches and unrealistic synthetic examples.

It should be noted that the present invention is not limited only to counting repetitive activity through video content, or even only with visual content. The system disclosed herein may operate on a variety of information signals, including sensor information used to detect physical movement. One such example might include the signal output information provided by an accelerometer, but a variety of other signals sources will have application with the present system.

It is therefore noted that the invention is not limited only to the specific embodiments, examples and experimental results disclosed herein. Obvious modifications and alterations will occur to others upon reading and understanding the preceding detailed description. It is intended that the invention be construed as including all such modifications and alternations insofar as they come within the scope of the claims.

What is claimed is:

1. A system for detecting and counting repetitive activity over time, comprising:
   a signal input to transfer, from outside to inside the system, signal information from which repetitive activity is detected and counted;
   one or more detectors for detecting repetitive activity from a plurality of time windows of fixed length, where the time windows contain said signal information;
   a processor that utilizes a trained deep neural network classifier for determination of and outputting an estimation of a cycle length of each repetition of the repetitive activity within each time window; and
   at least two registers to integrate the estimation provided by the processor between a count-start and a count-stop and to produce a count of the number of the repetitions.

2. The system of claim 1, wherein, the time windows have at least one fixed length.

3. The system of claim 2, wherein uncertainty in estimating the cycle length of the repetitive activity is used to select an appropriate window length for producing the count of the activity.

4. The system of claim 1, wherein the processor learns from a plurality of training examples.

5. The system of claim 4, wherein the plurality of training examples includes synthetic unrealistic data.

6. The system of claim 1, wherein said processor determines said estimation of said cycle length by classifying said repetitive activity into a classification that is characterized by said cycle length.

7. The system of claim 1, wherein said signal information comprises a video stream.

8. The system of claim 7, wherein said registers produce said count online while said video stream is still incomplete.

9. The system of claim 7, wherein said processor automatically detects, within each frame of said video stream, a region-of-interest containing said repetitive activity.

10. The system of claim 1, wherein said processor is configured for determining said count-start and count-stop based on an entropy of probabilities assigned by said deep neural network classifier.

11. A system for discerning whether repetitive activity is occurring over time, comprising:
    a signal input to transfer, from outside to inside the system, signal information from which it may be discerned whether repetitive activity has occurred;
    one or more detectors for detecting repetitive activity from a plurality of time windows of fixed length, where the windows contain said information; and a processor that utilizes a trained deep neural network classifier for determination of and outputting whether a repetitive activity is occurring within each time window.

12. The system of claim 11, wherein the detection of whether repetitive activity is occurring is based on uncertainty in estimating a cycle length as determined by the processor.

13. The system of claim 11, wherein said processor outputs an estimation of a cycle length of said repetitive activity.

14. The system of claim 13, wherein said processor determines said estimation of said cycle length by classifying said repetitive activity into a classification that is characterized by said cycle length.

15. The system of claim 11, wherein said signal information comprises a video stream.

16. The system of claim 15, wherein said processor produces said outputs online while said video stream is still incomplete.

17. The system of claim 15, wherein said processor automatically detects, within each frame of said video stream, a region-of-interest containing said repetitive activity.

18. The system of claim 11, wherein said processor is configured for determining whether a repetitive activity is occurring within each time window based on an entropy of probabilities assigned by said deep neural network classifier.

* * * * *